US012187869B2

United States Patent
Duong et al.

(10) Patent No.: US 12,187,869 B2
(45) Date of Patent: Jan. 7, 2025

(54) POLYETHYLENE TEREPHTHALATE (PET) AEROGEL

(71) Applicants: National University of Singapore, Singapore (SG); Agency for Science, Technology and Research, Singapore (SG)

(72) Inventors: Hai Minh Duong, Singapore (SG); Nhan Phan Thien, Singapore (SG); Thanh Xuan Nguyen, Singapore (SG); Salomo Steven, Singapore (SG); Xiwen Zhang, Singapore (SG); Duyen Khac Le, Singapore (SG)

(73) Assignees: Agency for Science, Technology and Research, Singapore (SG); National University of Singapore, Singapore (SG)

( * ) Notice: Subject to any disclaimer, the term of this patent is extended or adjusted under 35 U.S.C. 154(b) by 1092 days.

(21) Appl. No.: 15/733,653

(22) PCT Filed: Mar. 28, 2019

(86) PCT No.: PCT/SG2019/050171
§ 371 (c)(1),
(2) Date: Sep. 24, 2020

(87) PCT Pub. No.: WO2019/190400
PCT Pub. Date: Oct. 3, 2019

(65) Prior Publication Data
US 2021/0009780 A1 Jan. 14, 2021

(30) Foreign Application Priority Data

Mar. 28, 2018 (SG) .......................... 10201802587W

(51) Int. Cl.
*B01J 20/26* (2006.01)
*B01J 20/291* (2006.01)
(Continued)

(52) U.S. Cl.
CPC ............... *C08J 9/28* (2013.01); *B01J 20/267* (2013.01); *B01J 20/291* (2013.01);
(Continued)

(58) Field of Classification Search
CPC ...... B01J 20/267; C08J 2205/026; C08J 9/00; C08J 5/046
See application file for complete search history.

(56) References Cited

U.S. PATENT DOCUMENTS

| 5,866,027 A | 2/1999 | Frank et al. | |
|---|---|---|---|
| 2015/0259499 A1* | 9/2015 | Attia | C08J 9/28 521/64 |

OTHER PUBLICATIONS

Li. Super hydrophilic poly(ethylene terephthalate) (PET)/poly(vinyl alcohol) (PVA) composite fibrous mats with improved mechanical properties prepared via electrospinning process. Colloids and Surfaces A: Physicochem. Eng. Aspects 436 (2013) 417-424 (Year: 2013).*

(Continued)

*Primary Examiner* — Matthew E. Hoban
(74) *Attorney, Agent, or Firm* — Schwegman Lundberg & Woessner, P.A.

(57) ABSTRACT

A polyethylene terephthalate aerogel. There is provided a polyethylene terephthalate (PET) aerogel comprising a porous network of cross-linked recycled PET fibers, wherein the PET aerogel has a thermal conductivity of 0.030-0.050 W/m K. There is also provided a method of forming the PET aerogel.

20 Claims, 11 Drawing Sheets

(51) Int. Cl.
    *B01J 20/30*     (2006.01)
    *C08J 3/24*     (2006.01)
    *C08J 5/04*     (2006.01)
    *C08J 9/28*     (2006.01)
    *C09K 3/32*     (2006.01)

(52) U.S. Cl.
    CPC ....... *B01J 20/3064* (2013.01); *B01J 20/3085* (2013.01); *C08J 3/243* (2013.01); *C08J 5/046* (2013.01); *C09K 3/32* (2013.01); *C08J 2201/0484* (2013.01); *C08J 2205/026* (2013.01); *C08J 2367/03* (2013.01); *C08J 2429/04* (2013.01)

(56) References Cited

OTHER PUBLICATIONS

Oh. Ultra-porous Flexible PET/Aerogel Blanket for Sound Absorption and Thermal Insulation. Fibers and Polymers 2009, vol. 10, No. 5, 731-737 (Year: 2009).*

"International Application Serial No. PCT SG2019 050171, International Preliminary Report on Patentability mailed Sep. 29, 2020", (Sep. 29, 2020), 9 pgs.

"International Application Serial No. PCT/SG2019/050171, International Search Report mailed Jun. 21, 2019", (Jun. 21, 2019), 3 pgs.

"International Application Serial No. PCT/SG2019/050171, Written Opinion mailed Jun. 21, 2019", (Jun. 21, 2019), 7 pgs.

Koh, Hong Wei, et al., "Advanced recycled polyethylene terephthalate aerogels from plastic waste for acoustic and thermal insulation applications", Gels 4.2, (May 17, 2018), 43.

Li, Guihe, et al., "Super hydrophilic poly(ethylene terephthalate)(PET)/ poly (vinyl alcohol)(PVA) composite fibrous mats with improved mechanical properties prepared via electrospinning process", Colloids and Surfaces A: Physicochemical and Engineering Aspects 436, (Jul. 23, 2013), 417-424.

Oh, Kyung Wha, et al., "Ultra-porous flexible PET/Aerogel blanket for sound absorption and thermal insulation", Fibers and Polymers 10.5, (Jul. 2009), 731-737.

Salomo, Steven., et al., "Advanced fabrication and properties of hybrid polyethylene tetraphalate fiber-silica aerogels from plastic bottle waste", Colloids and Surfaces A: Physicochemical and Engineering Aspects 556, (Aug. 9, 2018), 37-42.

"Australian Application Serial No. 2019243822, Office Action dated Nov. 6, 2023", (Nov. 6, 2023), 4 pgs.

* cited by examiner

Figure 8
(a)
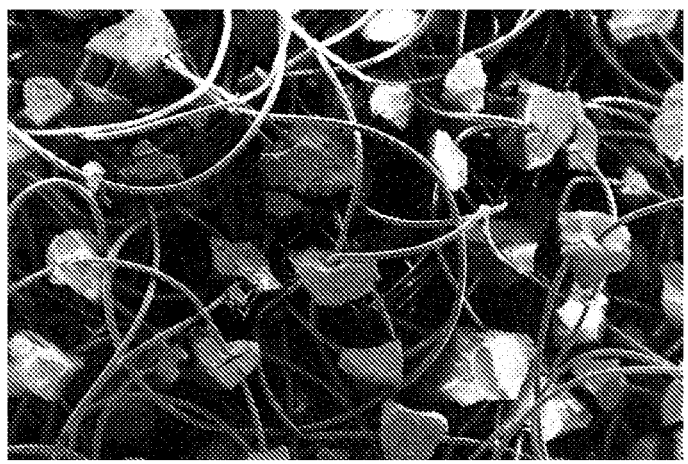
(b)
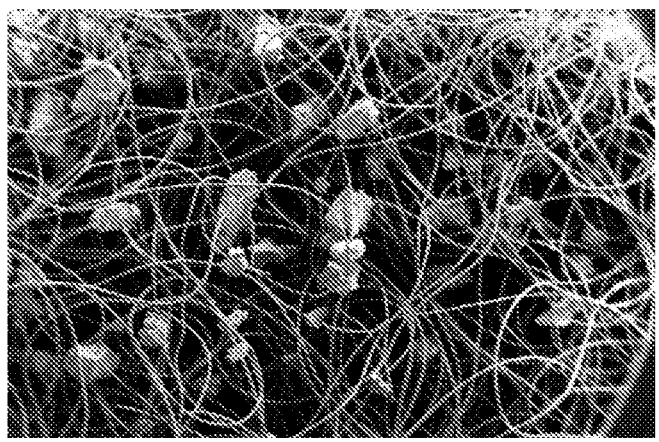
(c)
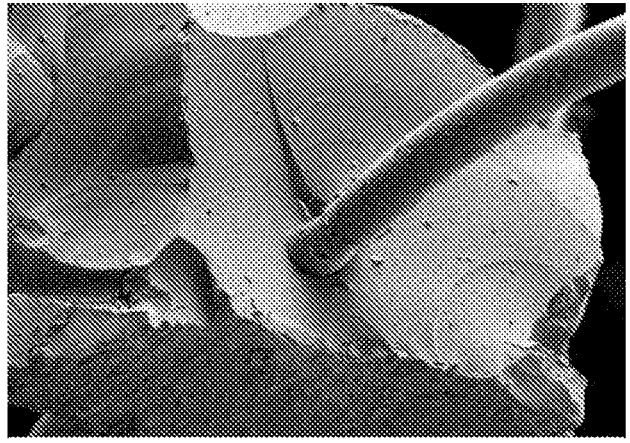

Figure 8 (continued)
(d)
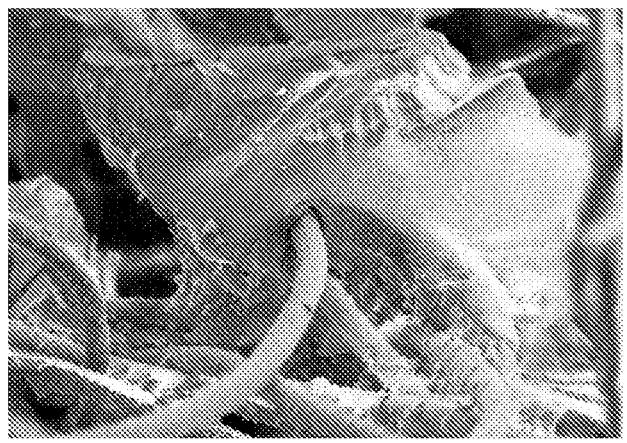
(e)
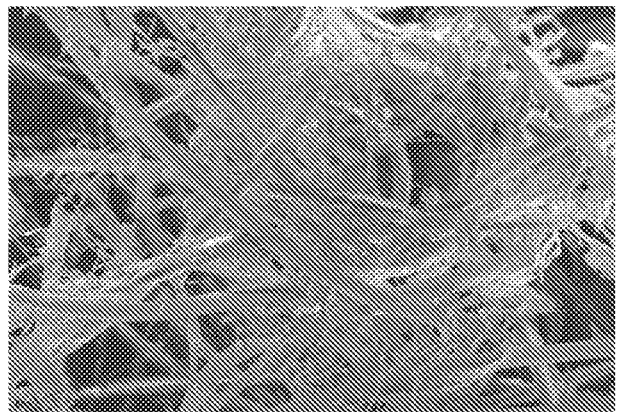
(f)
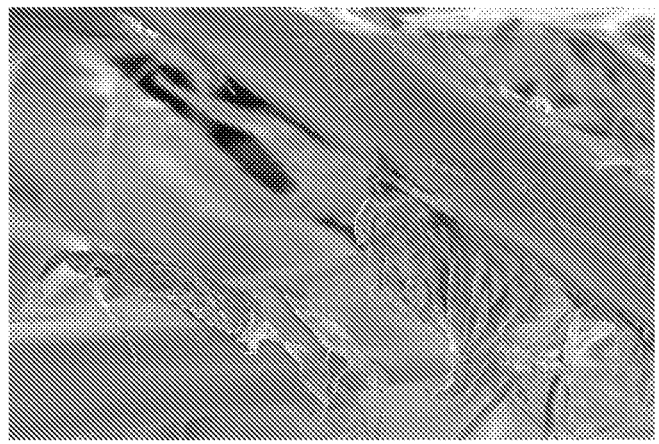

Figure 9
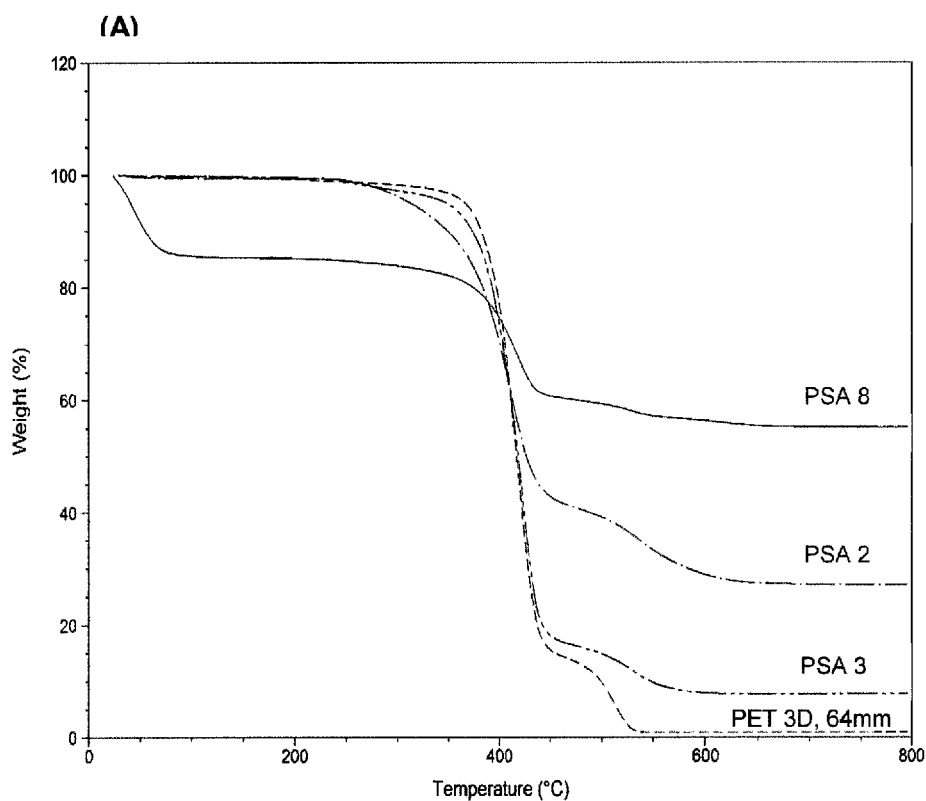
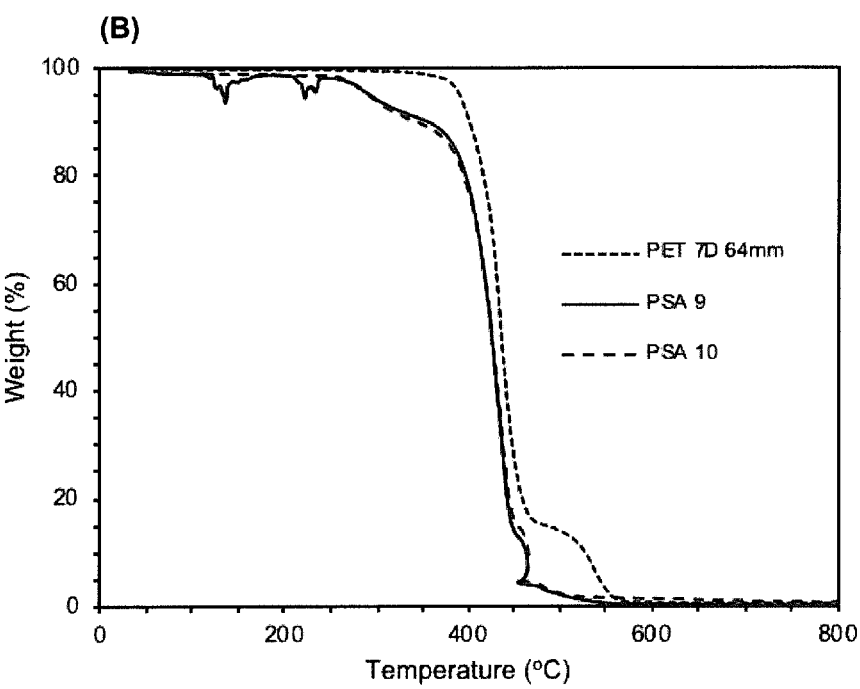

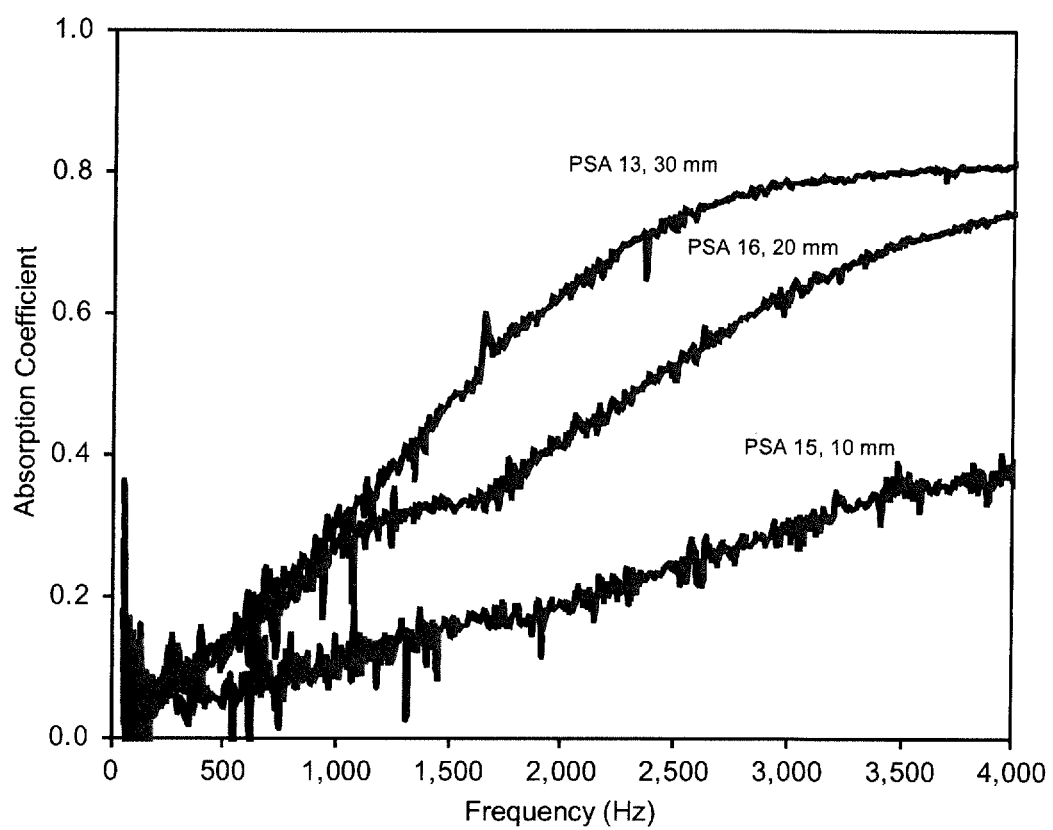

POLYETHYLENE TEREPHTHALATE (PET) AEROGEL

PRIORITY APPLICATIONS

This application is a U.S. National Stage Filing under 35 U.S.C. § 371 from International Application No. PCT/SG2019/050171, filed on Mar. 28, 2019, and published as WO2019/190400 on Oct. 3, 2018, 2019, which claims the benefit of priority to Singapore Application No. 10201802587W, filed on Mar. 28, 2018; the benefit of priority of each of which is hereby claimed herein, and which applications and publication are hereby incorporated herein by reference in their entirety.

TECHNICAL FIELD

The present invention relates to a polyethylene terephthalate aerogel and a method of forming the same.

BACKGROUND

Polyethylene terephthalate (PET) plastic bottles are very commonly used as disposable containers for drinks. Despite their cost-effectiveness and useful practical function, they pose a major problem to the environment. Accumulation of plastic waste can lead to contamination of a wide range of natural terrestrial, freshwater and marine habitats. Faced with such detrimental effects of PET plastic bottles, there is an ever increasing need to recycle PET plastic bottles. One of the recycling methods of PET plastic bottles is to convert them to PET fibers. Recycled PET fibers are used to improve properties of concrete as fiber-reinforcing concrete. However, damage may arise from the production of 1 kg of recycled PET fiber-based panel for building heat insulation. For example, the damage may be due to the: (a) PET thermobonding fibers damaged by the freight equipped intercontinental aircraft; (b) production of bottle-grade granulate PET; (c) medium voltage electricity consumption during the manufacturing of the PET fiber panel. There is therefore a need for an improved use of PET fibers.

SUMMARY OF THE INVENTION

The present invention seeks to address these problems, and/or to provide an improved aerogel comprising PET fibers.

In general terms, the invention relates to a PET aerogel comprising PET fibers made from recycled PET bottles. The PET aerogel according to the present invention has improved properties, making it useful for several applications. The invention also provides a simple and cost-effective method of making the PET aerogel According to a first aspect, the present invention provides a polyethylene terephthalate (PET) aerogel comprising a porous network of cross-linked recycled PET fibers. The PET aerogel may have a thermal conductivity of 0.030-0.050 W/m K.

According to a particular aspect, the recycled PET fibers comprised in the PET aerogel may be obtained from PET plastic bottles.

The cross-linked recycled PET fibers comprised in the aerogel may be cross-linked with a suitable cross-linker. For example, the cross-linked may be selected from, but not limited to: tetraethoxysilane (TEOS), polyvinyl alcohol (PVA), glutaraldehyde (GA), methyltrimethoxysilane (MTMS), sodium silicate, bentonite, starch, nanoclay, or a combination thereof.

According to a particular aspect, the cross-linker may be TEOS. According to another particular aspect, the cross-linker may be PVA. In particular, the cross-linker may be a combination of PVA and GA.

The PET aerogel may have several improved properties. For example, the PET aerogel may have a density of 0.007-0.450 g/cm$^3$.

According to a particular aspect, the PET aerogel may have a compressive Young's modulus of 130.0 kPa. The PET aerogel may be superhydrophobic. In particular, the PET aerogel may have a contact angle of 120-150°.

According to a second aspect of the present invention, there is provided a method of forming the PET aerogel described above, the method comprising:
  hydrolysing recycled PET fibers to form hydrolysed recycled PET fibers, wherein the hydrolysing forms at least carboxylic groups on a surface of the hydrolysed recycled PET fibers;
  cross-linking the hydrolysed recycled PET fibers with a cross-linker;
  gelation of cross-linked recycled PET fibers; and
  drying to form the PET aerogel.

In particular, the method of the present invention is a simple and easily scalable method.

According to a particular aspect, the method may further comprise sonicating the cross-linked recycled PET fibers prior to the drying.

The hydrolysing may comprise hydrolysing under acidic or base catalysis.

According to a particular aspect, the cross-linker used in the cross-linking may be selected from, but not limited to: tetraethoxysilane (TEOS), polyvinyl alcohol (PVA), glutaraldehyde (GA), methyltrimethoxysilane (MTMS), sodium silicate, bentonite, starch, nanoclay, or a combination thereof.

According to a particular embodiment, the cross-linker may be TEOS. When the cross-linker is TEOS, the gelation may comprise condensation of the cross-linked recycled PET fibers. Further, the drying may comprise aging for a pre-determined period of time.

According to another particular embodiment, the cross-linker may be PVA. In particular, the cross-linker may further comprise GA.

The drying may be by any suitable means. For example, the drying may comprise freezing and freeze-drying.

The method may further comprises modifying the surface of the PET aerogel. For example, the modifying may comprise any suitable type of modification of the surface. The modification may be by any suitable reagent. According to a particular aspect, the modifying may comprise treating the surface of the PET aerogel with, but not limited to: chlorotrimethylsilane (TMCS), methoxytrimethylsilane (MTMS), 3-aminopropyltrimethoxysilane (APS), fire-retardant ceramic coating solution, or a combination thereof.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 8 shows the scanning electron microscope (SEM) images of the PET aerogels fabricated with different PET fiber sizes and different PET concentration in the reaction media: FIG. 8(a) shows PSA 8 (15D, 32 mm) at Mag=20×, FIG. 8(b) shows PSA 2 (3D, 64 mm) at Mag=20×, FIG. 8(c) shows PSA 8 (15D, 32 mm) at Mag=200×, FIG. 8(d) shows PSA 2 (3D, 64 mm) at Mag=200×, FIG. 8(e) shows PSA 9 (7D, 64 mm) at Mag=80×, and FIG. 8(f) shows PSA 9 at Mag=500×;

FIG. 9 shows the thermal gravimetric analysis (TGA) curve of the PET aerogel in which FIG. 9(a) shows samples of PSA 2 (3D, 64 mm with PET concentration of 1.2 g/100 ml), PSA 3 (3D, 64 mm with PET concentration of 1.6 g/100 ml), PSA 8 (15D, 64 mm with PET concentration of 0.8 g/100 ml) and PET fiber (3D, 64 mm) and FIG. 9(b) shows samples of PSA 9 (7D, 64 mm with PET 1%), PSA 10 (7D, 64 mm with PET 2%) and PET fiber (7D, 64 mm);

FIG. 11 shows the compressive strain-stress curves of samples of different PET aerogels in which FIG. 12 shows the sound absorption coefficient of PET aerogels according to embodiments of the present invention in which FIG. 12(b) shows samples of the PET aerogels (7D, 64 mm, 1% concentration) with different thickness.

DETAILED DESCRIPTION

Figure 1:
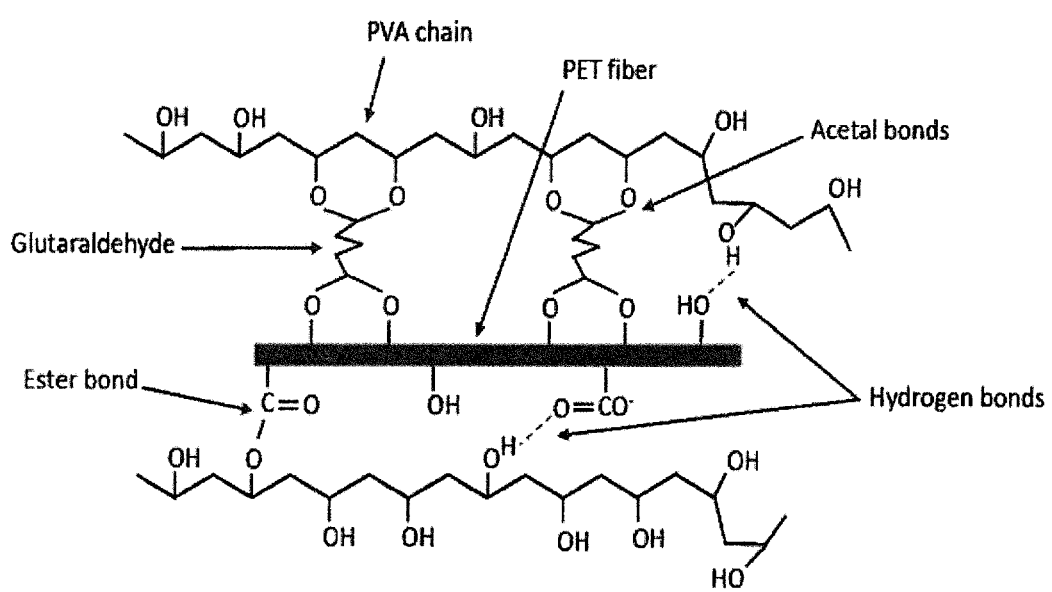
FIG. 1 shows the mechanism of cross-linking polyethylene terephthalate (PET) by polyvinyl alcohol (PVA) and glutaraldehyde (GA)

As explained above, there is a need to reduce accumulation of plastic waste, particularly PET waste, to reduce its detrimental impact to the environment. One of the methods of recycling PET plastic is to convert them into PET fibers. In particular, PET plastic bottles are first recycled into PET pellets. These pellets are the raw materials for the production of PET fiber. They are melted, extruded into fiber while warm to obtain PET fibers of various diameters and length.

Another material which has unique properties is aerogel. Aerogels generally have low density, high porosity, low thermal conductivity and large surface areas. Aerogels have been applied in many fields due to its unique properties. One of the most common aerogels is silica aerogel. However, silica aerogels are very fragile.

In general terms, the present invention relates to PET aerogels made from recycled PET fibers. The PET aerogels according to the present invention have superior properties. For example, the PET aerogels of the present invention are super-hydrophobic, have a very low thermal conductivity and demonstrate good sound insulation, good carbon dioxide absorption, high thermal stability and a very low compressive Young's modulus. Therefore, the PET aerogels may be used in a variety of applications such as heat and acoustic insulation, oil spill cleaning, medical devices, personal care products and packaging.

According to a first aspect, the present invention provides a polyethylene terephthalate (PET) aerogel comprising a porous network of cross-linked recycled PET fibers. In particular, the recycled PET fibers comprised in the PET aerogel may be obtained from PET plastic bottles. PET fibers are cheap and abundant. Accordingly, the cost of the aerogel may be reduced due to the ease to obtain the materials.

The PET fibers comprised in the PET aerogel may have a suitable diameter. For example, the average diameter of the PET fibers comprised in the PET aerogel may be ≤50 µm. In particular, the average diameter of the PET fibers may be 1-45 µm, 3-40 µm, 5-35 µm, 9-30 µm, 10-25 µm, 15-20 µm. Even more in particular, the average diameter may be 3-9 µm.

The PET aerogel may have high porosity. For example, the porosity of the PET aerogel may be ≥90%. In particular, the porosity of the PET aerogel may be ≥95%. Even more in particular, the porosity may be 95-99.5%.

The PET aerogel may have low thermal conductivity due to its highly porous network. In particular, the trapped air within the highly porous aerogel may contribute to its low thermal conductivity. For the purposes of the present invention, thermal conductivity may be defined as the measure of the PET aerogel to conduct heat. The thermal conductivity of the PET aerogels of the present invention are lower compared to PET fibers and comparable to convention insulation materials such as polyurethane foams and insulation boards. According to a particular aspect, the thermal conductivity of the PET aerogel may be 0.030-0.050 W/m K. In particular, the thermal conductivity of the PET aerogel may be 0.033-0.047 W/m K, 0.034-0.046 W/m K, 0.035-0.045 W/m K, 0.036-0.043, 0.037-0.042 W/m K, 0.039-0.040 W/m K. Therefore, the PET aerogels may be suitable for use in thermal insulation.

The PET aerogel may have a low density of 0.007-0.450 g/cm$^3$. In particular, the density of the aerogel may be 0.007-0.35 g/cm$^3$, 0.014-0.30 g/cm$^3$, 0.030-0.20 g/cm$^3$, 0.070-0.15 g/cm$^3$, 0.097-0.1 g/cm$^3$. The PET aerogel may have a low compressive Young's modulus. Compressive Young's modulus may be defined as a measure of the stiffness of a solid material. In particular, the PET aerogel may have a low Young's modulus due to the low density of the aerogel. According to a particular aspect, the PET aerogel may have a compressive Young's modulus of 130.0 kPa. In particular, the compressive Young's modulus of the PET aerogel may be 0.5-125 kPa, 0.7-100 kPa, 0.9-50 kPa, 1.0-40 kPa, 1.2-40.0 kPa, 1.4-15.0 kPa, 1.5-10.0 kPa, 2.0-7.3 kPa, 2.2-7.0 kPa, 2.4-6.0 kPa, 2.5-5.5 kPa, 2.8-4.5 kPa, 3.0-4.0 kPa. Even more in particular, the compressive Young's modulus may be 1.2-2.9 kPa. In view of the low compressive Young's modulus, the PET aerogel may be able to spring back to its original shape instead of being deformed after being compressed. In particular, the PET aerogel may return to approximately 95% of its initial volume following compression. Accordingly, the PET aerogel of the present invention is durable for repeated use. In particular, the PET aerogel has a much lower Young's modulus compared to pure silica aerogels or silica-cellulose aerogels known in the art.

The PET aerogel may be superhydrophobic. In particular, the PET aerogel may have a contact angle of 120-150°. In particular, the PET aerogel may have a contact angle of 120.7-149.8°. According to a particular aspect, the water contact angle may increase when the fiber concentration comprised in the PET aerogel increases. This is because the aerogel surface may be denser due to the addition of more PET fibers within the aerogel. The superhydrophobicity of the PET aerogel may be attributed to the stability of stability of the non-polar methyl groups from the surface modification of the PET aerogel. In particular, the surface modification may comprise replacement of the polar hydroxyl groups with non-polar methyl groups (R—$CH_3$). The advantage of the PET aerogel being superhydrophobic is that diffusion of the ambient moisture in the porous structure of the PET aerogel is prevented.

According to a particular aspect, the cross-linked recycled PET fibers comprised in the aerogel may be cross-linked with a suitable cross-linker to form the PET aerogel. For example, the cross-linked may be selected from, but not limited to: tetraethoxysilane (TEOS), polyvinyl alcohol (PVA), glutaraldehyde (GA), methyltrimethoxysilane (MTMS), sodium silicate, bentonite, starch, nanoclay, or a combination thereof.

According to a particular embodiment, the cross-linker may be TEOS. The silica oxide particles comprised in TEOS which have a large number of hydroxyl groups (—OH) attached to their surface link with the PET fibers. In particular, the carboxylic groups of the PET fibers may be exposed, thereby reacting with the hydroxyl groups on the surface of the silica particles to form ester bonds. The polar hydroxyl groups on the silica particles of the TEOS may form strong hydrogen bonds with ester groups of the PET fibers. Further, due to the high hydrophobicity of the inner domain of silica oxide particles and that of polyethylene groups in PET fibers, the PET fibers may form strong physical bonds with silica particles through Van der Waals interaction or dispersion forces.

According to another particular embodiment, the cross-linker may be PVA. In particular, the cross-linker may be a combination of PVA and GA. Carboxyl and hydroxyl groups may be created on the surface of the PET fibers following a pre-treatment. The carboxyl groups on the surface of the PET fiber may also react directly with hydroxyl groups of PVA to form ester bonds. Further, hydroxyl groups of PVA may form strong hydrogen bonds with ester groups of PET fibers. The GA may enhance the bonding between the PVA and the modified PET fibers. In particular, the GA may give good attachment of PVA on the modified PET fibers because it has two aldehyde groups and may react with different chemical groups simultaneously. For example, one aldehyde group of GA may react with hydroxyl group of the modified PET fibers to give a hemiacetal. The hemiacetal, having another aldehyde group on the other end, may further react with the hydroxyl groups of PVA to form acetyl bonds. Accordingly, silica oxide particles and PVA may form strong cross-linking with PET fibers due to their compatibility to form strong chemical and physical cross-linking. An example of the cross-linking of PET fibers by PVA and GA is as shown in FIG. 1.

The PET aerogel according to the present invention may also have a high sound absorption coefficient. For example, the sound coefficient of the PET aerogel may be 0.10-0.45. According to a particular aspect, the sound absorption coefficient may be comparable to known sound insulation materials such as Basmel (sound coefficient of 0.4), hardwood (sound coefficient of 0.3) and cork sheet (sound coefficient of 0.1-0.2).

The PET aerogel may also have a high $CO_2$ absorption capacity. For example, the $CO_2$ absorption capacity of the PET aerogel according to a particular aspect of the present invention may be about 0.5-1.5 mmol $CO_2$/g. Accordingly, the PET aerogel may allow significant uptake of $CO_2$ even at low $CO_2$ partial pressure.

According to a second aspect of the present invention, there is provided a method of forming the PET aerogel described above, the method comprising:
   hydrolysing recycled PET fibers to form hydrolysed recycled PET fibers, wherein the hydrolysing forms at least carboxylic groups on a surface of the hydrolysed recycled PET fibers;
   cross-linking the hydrolysed recycled PET fibers with a cross-linker;
   gelation of cross-linked recycled PET fibers; and
   drying to form the PET aerogel.

In particular, the method of the present invention is a simple and easily scalable method. Further, the method of the present invention is safe.

The recycled PET fibers used in the method of the present invention may be obtained from any suitable source. For example, the recycled PET fibers may be from PET plastic bottles.

The method may further comprise pre-treating the recycled PET fibers prior to the hydrolysing. The pre-treating may comprise rinsing the recycled PET fibers in a solvent to remove finishing agents. The solvent may be any suitable solvent. For example, the solvent may be any alkaline solution having a pH of 12-14, any acid solution having a pH of 1-3 or dichloromethane (DCM). Suitable alkaline solutions may be, but is not limited to, sodium hydroxide (NaOH), potassium hydroxide (KOH), calcium hydroxide ($Ca(OH)_2$). Suitable acidic solutions may be, but is not limited to, hydrochloric acid (HCl), sulphuric acid ($H_2SO_4$), nitric acid ($HNO_3$).

The pre-treating may further comprise drying the PET fibers for a suitable period of time following the rinsing. The drying may be under ambient conditions.

The hydrolysing may comprise hydrolysing under acidic or base catalysis, or neutral conditions. The hydrolysing may comprise adjusting the pH to a suitable pH.

According to a particular aspect, when the hydrolysing is under acidic catalysis, the pH may be adjusted to 1-3. The hydrolysing may comprise adding a suitable reagent. For example, the reagent may be, but is not limited to, HCl, $H_2SO_4$, $HNO_3$.

According to a particular aspect, when the hydrolysing is under base catalysis, the pH may be adjusted to 12-14. The hydrolysing may comprise adding a suitable reagent. For example, the reagent may be, but is not limited to, NaOH, KOH, $Ca(OH)_2$.

According to a particular aspect, when the hydrolysing is under neutral conditions, the hydrolysing may comprise using water or steam.

The method may further comprise sonicating the hydrolysed recycled PET fibers following the hydrolysing. The sonicating may be for a pre-determined period of time. The sonicating may ensure that the reagent added for the hydrolysing is distributed uniformly in the reaction media.

The cross-linker used in the cross-linking may be any suitable cross-linker. According to a particular aspect, the cross-linker used in the cross-linking may be selected from, but not limited to: tetraethoxysilane (TEOS), polyvinyl alcohol (PVA), glutaraldehyde (GA), methyltrimethoxysilane (MTMS), sodium silicate, bentonite, starch, nanoclay, or a combination thereof.

The method may further comprise sonicating the cross-linked recycled PET fibers following the hydrolysing. The sonicating may be for a pre-determined period of time.

The sonicating may ensure that the cross-linker added for the cross-linking is distributed uniformly in the reaction media and air bubbles are removed.

The gelation may comprise aging the cross-linked recycled PET fibers. The gelation may be for a suitable period of time under suitable conditions. According to a particular aspect, the gelation may comprise aging the cross-linked recycled PET fibers under ambient conditions. According to another particular aspect, the gelation may comprise aging the cross-linked recycled PET fibers by freezing the cross-linked recycled PET fibers. The freezing may be in a refrigerator or in nitrogen liquid.

The drying may be by any suitable means. According to a particular aspect, the drying may comprise ambient pressure drying or freeze-drying. The freeze-drying may be under suitable conditions such as in vacuum. The drying may be for a suitable period of time. For example, the drying may be for 10-168 hours. In particular, when the drying comprises ambient pressure drying, the drying may be for 1-7 days. Even more in particular, the drying may be for 3-7 days. In particular, when the drying comprises freeze-drying, the drying may be for 10-48 hours.

According to a particular aspect, the method may further comprise sonicating the mixture prior to the drying.

The method may further comprise modifying the surface of the PET aerogel. For example, the modifying may comprise any suitable type of modification of the surface. The modification may be by any suitable reagent. According to a particular aspect, the modifying may comprise treating the surface of the PET aerogel with, but not limited to: chlorotrimethylsilane (TMCS), methoxytrimethylsilane (MTMS), 3-aminopropyltrimethoxysilane (APS), fire-retardant ceramic coating solution, or a combination thereof.

According to a particular embodiment, the method of the present invention may comprise forming the PET aerogel according to method described above, wherein the drying comprises ambient pressure drying. In particular, the method may comprise rinsing the recycled PET fibers in DCM for 24 hours following by drying in air. The recycled PET fibers may then be hydrolysed by adding a mixture of TEOS, ethanol (EtOH) and water to the recycled PET fibers. HCl may also be added to promote the hydrolysing. In particular, the HCl may be added to control the pH of the reaction media at 2.5. Following the hydrolysing, the hydrolysed recycled PET fibers may be sonicated to ensure uniform distribution of the reaction media. The method may further comprise cross-linking the mixture by adding a mixture of EtOH/water and $NH_4OH$. The pH of the reaction media may be controlled at a pH of 7-8 during the cross-linking. Following the cross-linking, the mixture may be sonicated to ensure all particles inside the cross-linked mixture are distributed evenly. The cross-linked mixture may be a sol. The cross-linked mixture may be aged for gelation for a period of time, for example for 24 hours. Following the aging, the cross-linked mixture may harden and form an organogel. The organogel may be dipped in a suitable solvent, such as EtOH for solvent exchange to further age silica in the sol and wash any unreacted cross-linker. The sol may then be dipped in a further reagent, such as n-hexane, to remove EtOH. The sol may be dried under room temperature for a period of time to form the PET aerogel.

Surface modification of the PET aerogel may be carried out before and/or after the drying. According to a particular aspect, the surface modification may be before the drying. The surface modification may comprise dipping the sol in TMCS/n-hexane solution for a period of time prior to the drying. The surface modification with TMCS may increase the compressive modulus of the PET aerogel. In particular, with TCMS treatment, the water molecules are removed as hydroxyl groups of the silica are replaced with hydrophobic methyl groups. This prevents the collapsing of the gel network during the drying.

According to another particular embodiment, the method of the present invention may comprise forming the PET aerogel according to method described above, wherein the drying comprises freeze-drying. In particular, the method may comprise hydrolysing the recycled PET fibers with aqueous NaOH to produce carboxy and hydroxyl groups on the surface of the recycled PET fibers. The mixture may be heated to a suitable temperature, such as about 80° C., to accelerate the hydrolysing. The hydrolysed recycled PET fibers may then be washed with water to remove all the remaining NaOH before immersing the PET fibers into a mixture of PVA, GA and DI water for cross-linking. The mechanism of the cross-linking may be as shown in FIG. 1. The use of PVA and GA as a cross-linker is advantageous because PVA is an inexpensive polymer which is water soluble, biocompatible and biodegradable. GA further increases the strength of the aerogel formed from the method. The pH of the cross-linking may be controlled at 3 by adding HCl to accelerate the cross-linking. The cross-linking may be carried out at a temperature of about 80° C. for about 3 hours. Following the cross-linking, the cross-linked recycled PET fibers may be sonicated for homogenization and removal of bubbles. The cross-linked recycled PET fibers may be placed in a freezer for a period of time, such as 6-8 hours, to freeze the PET fibers. The frozen PET fibers may then be freeze-dried for a period of time, such as 48 hours, to remove all the solvent and form the PET aerogel. Freeze-drying may be a cost effective method for mass production of the PET aerogel. The PET aerogel may be surface modified. For example, the PET aerogel may be surface modified by coating MTMS on the surface of the PET aerogel.

In particular, the method of the present invention is a simple and easily scalable method. Further, the method of the present invention is safe. The method of the present invention uses recycled PET fibers instead of PET nonwoven fabric which is used in the method of prior art. Accordingly, the method of the present invention enables the use of recycled PET fibers to form an eco-friendly aerogel, thereby enabling use of the PET from plastic bottle waste. This helps in reducing plastic bottle waste while forming an aerogel with many functional uses in various applications.

Whilst the foregoing description has described exemplary embodiments, it will be understood by those skilled in the technology concerned that many variations may be made without departing from the present invention.

Having now generally described the invention, the same will be more readily understood through reference to the following examples which are provided by way of illustration, and are not intended to be limiting.

EXAMPLE

Example 1

Tetraethoxysilane (TEOS) and trimethychlorosilane (TMCS) were purchased from Sigma-Aldrich Chemical Co.

The solvents used in the fabrication of aerogels including ethanol and n-hexane were supplied from Sigma-Aldrich Chemical Co. Recycled PET fibers with fiber mass density of 3, 7, and 15 Denier and fiber length of 32 and 64 mm were purchased from Foshan Rongsheng Furniture Material Co. Ltd.

Figure 2:
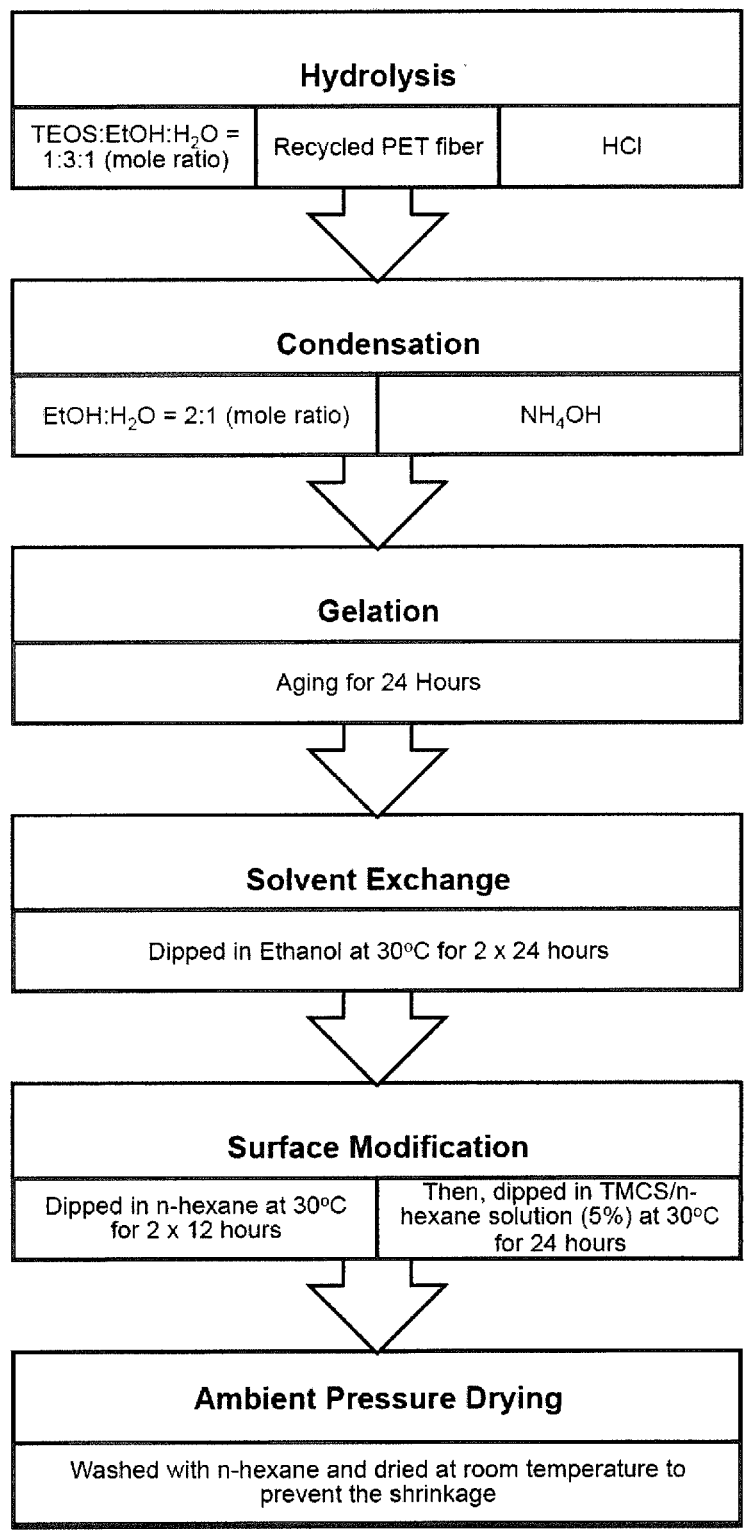
FIG. 2 shows the method of forming the PET aerogel according to one embodiment of the present invention.

Polyvinyl alcohol (PVA, MW about 70,000 g/mol), glutaraldehyde (GA, 25% in water), sodium hydroxide (NaOH), hydrochloric acid (HCl, 37%), methoxytrimethylsilane (MTMS), and 3-aminopropyltrimethoxysilane (APS) were all purchased from Sigma-Aldrich Chemical Co. Commercial ceramic coating (CC) was purchased from TrendyShack, China. All of the reagents were used without further purification Method A—Ambient Pressure Drying A summary of the method is as shown in FIG. 2. In order to remove finishing agents, recycled PET fiber was partially dissolved by firstly rinsing in dicholoromethane (DCM) for 24 hours followed by drying in air. Two-step aerogels were prepared from TEOS, $H_2O$, EtOH, HCl and $NH_4OH$ at different mass concentrations of PET fiber dipped in the reaction media (Table 1).

TABLE 1

Summary of PET aerogels prepared for Method A

| Sample Name | PET Concentration in reaction media (g/100 mL) | Mass Density (Denier) | TMCS Treatment | DCM Treatment | Fiber Length (mm) | Density of samples (g/cm³) |
|---|---|---|---|---|---|---|
| PSA 1 | 0.8017 (0.8) | 3 | Yes | Yes | 64 | 0.170 ± 0.005 |
| PSA 2 | 1.2014 (1.2) | 3 | Yes | Yes | 64 | 0.097 ± 0.005 |
| PSA 3 | 1.603 (1.6) | 3 | Yes | Yes | 64 | 0.149 ± 0.005 |
| PSA 4 | 0.8005 (0.8) | 7 | Yes | Yes | 64 | 0.181 ± 0.005 |
| PSA 5 | 0.799 (0.8) | 15 | Yes | Yes | 64 | 0.082 ± 0.005 |
| PSA 6 | 0.8023 (0.8) | 3 | No | Yes | 64 | 0.345 ± 0.005 |
| PSA 7 | 0.801 (0.8) | 15 | No | No | 64 | 0.181 ± 0.005 |
| PSA 8 | 0.7994 (0.8) | 15 | No | No | 32 | 0.165 ± 0.005 |

To promote hydrolysis, HCl was used to control the pH of reaction media at 2.5. Another sonication was done for 10 minutes to ensure HCl particles were distributed uniformly in the reaction media. The hydrolysis was as follows:

Hydrolysis:

The second step (gelation) involved mixing EtOH/$H_2O$ and $NH_4OH$ to the reaction media. 42 ml of EtOH/$H_2O$ mixture (EtOH:$H_2O$=2:1 (mole ratio)) was poured to the reaction media. $NH_4OH$ was used to promote condensation and control the pH 7-8. Another sonication was done for 10 minutes to ensure all particles inside the sol distributed uniformly before aging it for 24 hours.

Condensation:

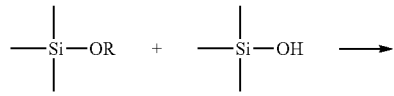

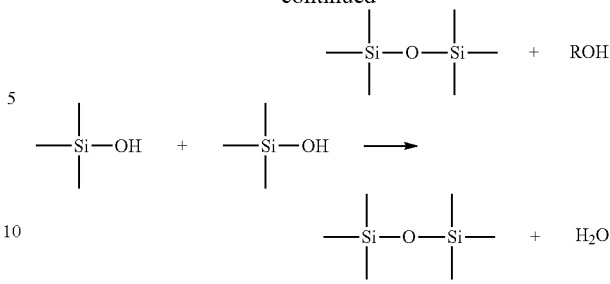

After aging for 24 hours, the reaction media hardened and formed an organogel. It was a transparent gel and a distribution of PET fiber could be seen clearly when the gel was exposed to light. The organogel was dipped in EtOH for solvent exchange to further age the silica and wash the unreacted monomer and water.

Figure 3:
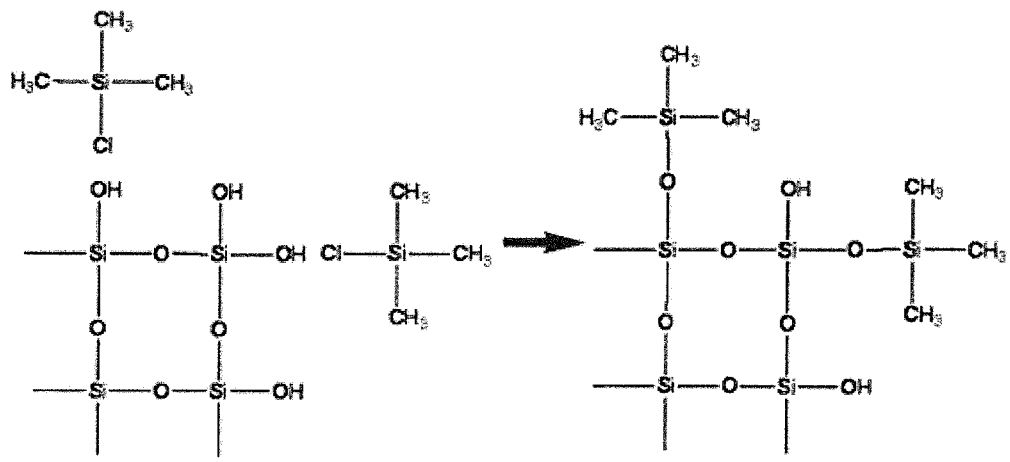
FIG. 3 shows the surface modification of the PET aerogels by chlorotrimethylsilane (TMCS)

After solvent exchange, the organogel was dipped in n-hexane to remove EtOH twice for 12 hours. Then, it was dipped in TMCS/n-hexane solution (5% TMCS), and the surface modification was carried out for 24 hours. FIG. 3 shows the surface modification reaction in which the hydroxyl groups are replaced by methyl groups.

After modification, the organogel was washed with n-hexane and dried at room temperature to prevent shrinkage. There were still a certain number of hydroxyl groups on silica oxide surface even after complete condensation. Accordingly, when hexane was removed, the hydroxyl groups could react with each other or further condensation could occur which caused pores to contract irreversibly and collapse the gel network. Dipping organogel into TMCS replaced hydroxyl groups with methyl groups which do not react with each other, thereby avoiding the collapsing of the gel network.

Method B—Freeze-Drying

Figure 4:
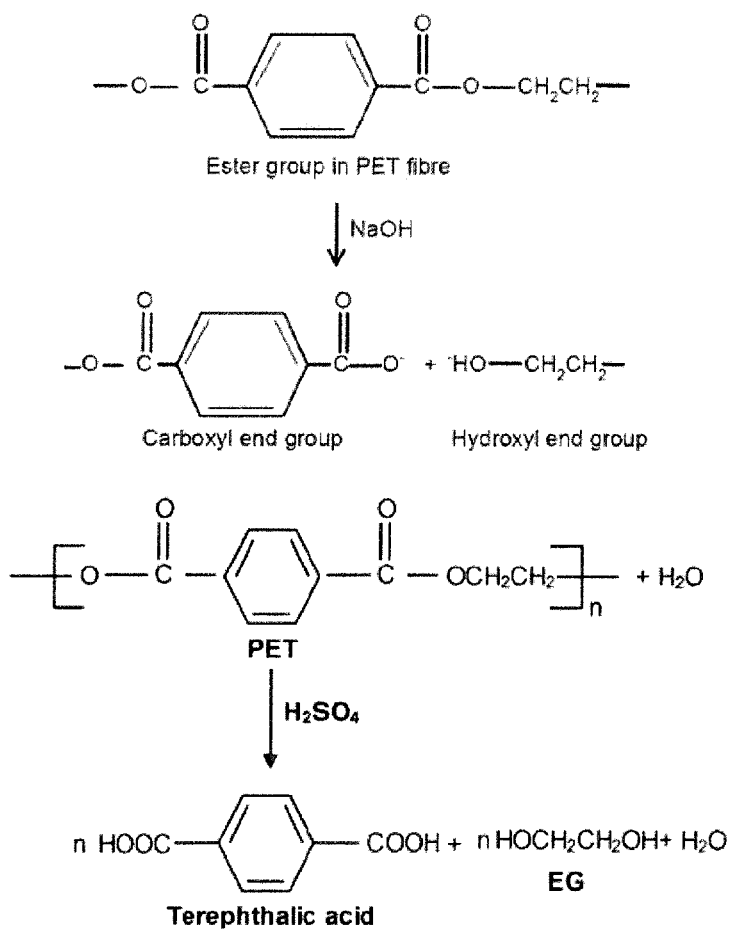
FIG. 4 shows the functionalization of PET fibre under alkaline and acidic conditions.

Recycled PET fibers with various morphology and weight fractions were dissolved and surface functionalized by treatment in sodium hydroxide 40 g/L solution at 80° C. for 1 hour to functionalize carboxyl groups on the surface as shown in FIG. 4. The ratio of PET fiber and NaOH was 1:100. PET surface functionalization may also be carried out in acidic condition such as HCl solution or neutral condition with the use of water or steam. The PET fibers were then washed with water to remove sodium hydroxide or acid before they were dipped and swelled in PVA/glutaraldehyde (GA)/$H_2O$ mixture.

The concentration of PET fiber dipped was changed from 1 to 4 wt %. Table 2 provides the summary of the aerogels prepared from method B. The mixture of treated recycle PET fibers (1 g), PVA solution (4 mL, 0.05 g/mL), GA solution (80 µL, 25%) and a desired amount of water (depending on the concentration of PET fiber) were sonicated together under 400 W powder for 10 times, each for 3 minutes with a break of 30 seconds in between using Hielscher Ultrasound Technology UIP2000hdT sonicator. pH of reaction media was controlled to 3 by HCl solution during the sonication process. Another sonication was done for 1 hour in ultrasonic bath to remove air bubbles and obtain the uniform suspension. The cross-linking reaction was carried out in an oven at 80° C. for 3 hours. The cross-linking is as shown in FIG. 1. Thereafter, the mixture was frozen in a refrigerator at −18° C. overnight or in nitrogen liquid for a few minutes and the resulting frozen sample was freeze-dried using a ScanVac CoolSafe 95-15 Pro freeze dryer at a condenser temperature of −93° C. under vacuum (0.0018 mbar) for two days to produce the PET aerogel.

TABLE 2

Summary of PET aerogels prepared for Method B

| Sample Name | PET Concentration (%) | PVA Concentration (%) | Mass Density (Denier) | MTMS Treatment | Fiber Length (mm) | Density of samples (g/cm³) |
|---|---|---|---|---|---|---|
| PSA 9 | 1.0 | 0.2 | 7 | Yes | 64 | 0.018 ± 0.005 |
| PSA 10 | 2.0 | 0.2 | 7 | Yes | 64 | 0.027 ± 0.005 |
| PSA 11 | 4.0 | 0.2 | 7 | No | 64 | 0.044 ± 0.005 |

The PET aerogels were surface modified with various modification treatments.

(a) Hydrophobicity Surface Modification

Figure 5:
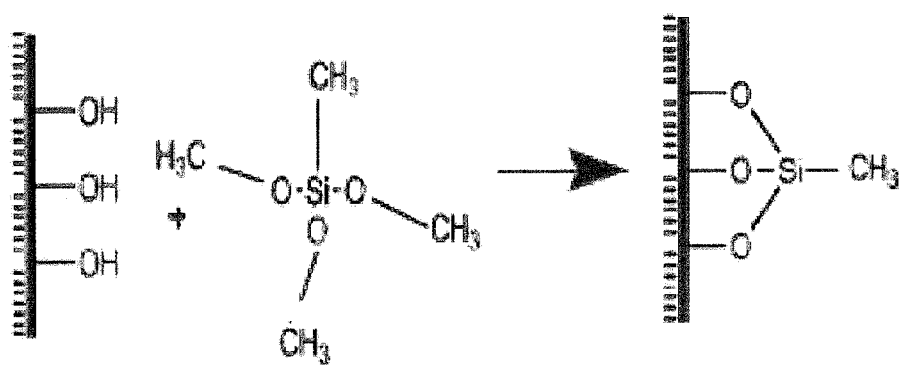
FIG. 5 shows the surface modification of the PET aerogel by methoxytrimethylsilane (MTMS)

The recycled PET aerogel was placed in a big glass bottle. A small open glass vial containing MTMS was added into the glass bottle. Then the glass bottle was capped and heated in an oven at 70° C. for 24 hours for the silanation reaction. Thereafter, to remove the excess amount of unreacted silane, the coated sample was placed in a vacuum oven until the pressure reached 0.03 mbar for 1 hour. The surface treatment reaction is as shown in FIG. 5.

(b) Aminosilane Treatment

Figure 6:
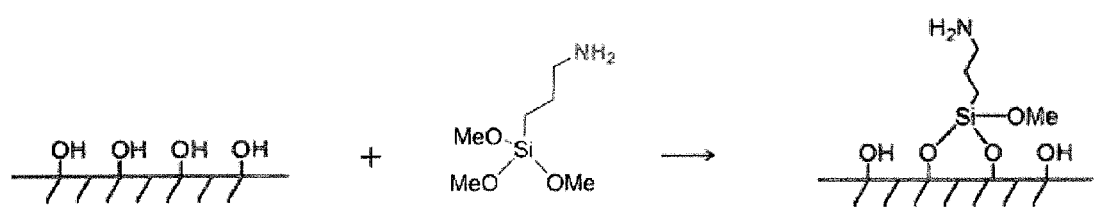
FIG. 6 shows the aminosilane treatment of the PET aerogel by 3-aminopropyltrimethoxysilane (APS)

Aminosilane treatment for the PET aerogels was using the same method of hydrophobicity surface modification. The PET aerogel was cured in APS vapour at 90° C. for 24 hours. After that, to remove the unreacted APS, the treated sample was placed in a vacuum oven for 1 hour. The surface treatment reaction is as shown in FIG. 6.

(c) Fire-Retardant Treatment

The fire-retardant solution was prepared by diluting the commercial ceramic coating (CC) with EtOH and stirred to ensure homogeneity. The PET aerogel was then submerged in the fire-retardant solution to absorb the ceramic coating till saturation. Subsequently, the PET aerogel was removed from the solution and left to dry at room temperature.

Figure 7:
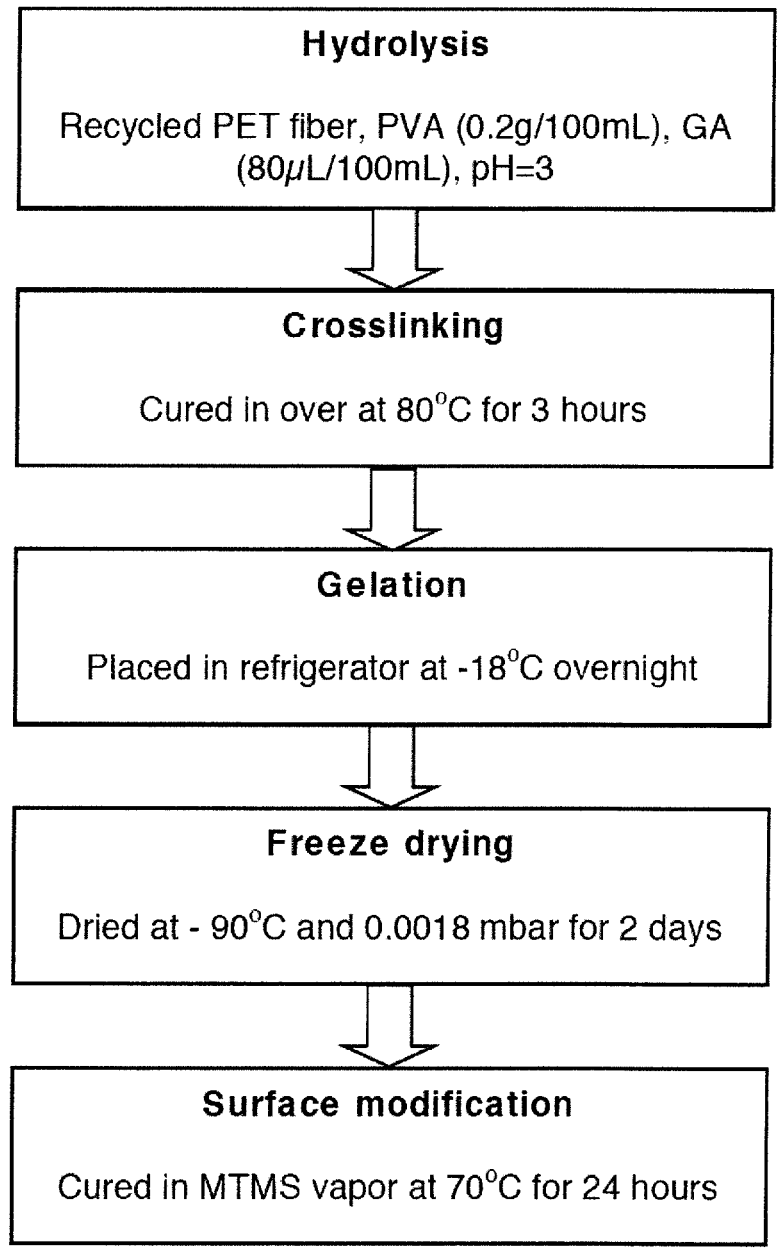
FIG. 7 shows the method of forming the PET aerogel according to one embodiment of the present invention.

A summary of the freeze-drying method of preparing the PET aerogel is as shown in FIG. 7.

Characterization

The morphology of the PET aerogel samples was investigated using a scanning electron microscopy (Carl Zeiss AG SEM EVO 50). The samples were coated with a thin layer of gold by sputtering prior to SEM. The hydrophobicity of the aerogel samples was investigated by conducting a water contact angle test on the surface of the samples. A VCA Optima goniometer (AST Products Inc., USA) was used for this test. The machine was controlled by a software built-in function where 2.5 µl of water was dispensed from the syringe every time. Using the software, water contact angle could be calculated automatically. The measurement was repeated at different surface positions of the samples and an average was taken.

The thermal conductivity of the aerogel was determined by a C-Therm TCi Thermal Conductivity Analyzer (C-Therm Technologies, Canada) using the modified transient plane source method under ambient conditions. The Thermal Gravimetric Analysis (TGA) tests were performed by a TA Instruments Q500 Thermogravimetric Analyzer to study the thermal stability of the aerogels. The specimen was heated from room temperature to 800° C. at a rate of 10° C./min in air. The compressive test was carried out on an Instron 5500 micrometer (USA) to investigate the compressive moduli of the aerogels. During the test, the specimen was under a loading at a rate of 1 mm/min.

The sound absorption test was performed based on ASTM E1050 with an average room temperature and humidity of 26° C. and 60%, respectively. Each cylindrical PET aerogels sample was slotted into the specimen holder of the impedance tube. Subsequently, three measurements (5 seconds each) were recorded between 20 Hz to 6.1 kHz, following an arithmetic averaging to obtain the sound absorption properties of the test specimen. Noise reduction coefficient (NRC), a simple quantification of absorption of sound by material, was calculated by the arithmetic average of the absorption coefficients determined at the octave band of 250 Hz, 500 Hz, 1000 Hz, and 2000 Hz, rounded to the nearest multiple of 0.05.

The $CO_2$ sorption isotherms were measured up to 1 bar using a Quantachrome iQ3 automated gas sorption analyzer. Before the measurements, the sample (~50 mg) was degassed under reduced pressure ($<10^{-2}$ Pa) at 80° C. for 10 hours. UHP grade $CO_2$ was used for the measurement. Oil-free vacuum pumps and oil-free pressure regulators were used to prevent contamination of the samples during the degassing processes and isotherm measurements. The temperature of 298 K was maintained under room temperature for the measurement.

Results

Morphologies and Structures of PET Aerogels

FIG. 8 shows the scanning electron micrograph (SEM) photograph, revealing the surface of the PET aerogels. The morphologies of the PET aerogel exhibited a porous network structure. FIG. 8(b) clearly shows the distribution of silica particles in the PET fiber matrix. They were distributed randomly in the PET fiber matrix. Comparing between FIGS. 8(c) and 8(d), it can be seen that the PSA 8 sample of mass density 15 Denier has a diameter of approximately 60 microns while the PSA 2 sample of mass density 3 Denier has a diameter of approximately 20 microns. A good interaction between the PET fiber and silica particles can be observed with the very narrow gap between them. As such, PET fibers and silica particles cross-linked well, enhancing both the thermal and mechanical properties of the PET aerogels.

The structure of PET aerogels developed by PVA/GA cross linkers is as shown in FIGS. 8(e) and 8(f). The uniform distribution of PVA in the PET fiber matrix and the good bonding of PVA on the surface of PET fibers can be clearly seen. The PET aerogel formed from method B also has an open porous network structure, indicating that recycled PET fibers successfully formed a three-dimensional porous network. The PVA/GA cross-linkers diffused and reacted with the PET fiber surface to form acetal and ester bonds to generate porous PET structure. The PET fiber has a diameter of approximately 50 microns.

The difference in surface characteristics of PET aerogels upon treatment of DCM and surface modification with TMCS/MTMS was also observed. The PSA 8 sample had a rougher texture due to the presence of silica particles on the outer surface of the aerogel. This is because of the silica gel network collapsing during the ambient pressure drying process, resulting in silica particles escaping the PET fiber matrix. On the other hand, the PSA 1 sample showed a smoother texture and a more uniform aerogel. During the surface modification process, methyl groups from TMCS replaced hydroxyl groups from the silica gel network, preventing the network from collapsing during the drying process. Also, with the PET fibers being pre-treated with DCM, these fibers formed a better cross-linking with the silica particles, which contributed to the smoother and uniform finish of the aerogel.

The PET aerogel developed by PVA via method B had a smoother surface and more uniform aerogel. In this technique, the samples were frozen, and the surrounding pressure was reduced to allow the frozen water in the samples to sublimate directly from the solid phase to the gas phase, which created minimal force on the pore walls of the aerogels, preventing the porous structure from collapsing.

Hydrophobicity of the PET Aerogels

Exhibition of inherent superhydrophobicity was observed in the aerogels prepared from both the TMCS-treated rPET aerogel surface and rPET-PVA aerogel surface. The average water contact angle was approximately 145.5° for all types of the rPET aerogels that underwent TMCS/MTMS treatment. The different properties of rPET fibers used and their concentration in reaction media did not cause any significant difference among the water contact angles of the aerogels. This excellent water-repellent property was inherited from the treatment of the samples with TMCS/MTMS. The stable methyl group of TMCS/MTMS was responsible for the excellent hydrophobicity of the silica components. On the other hand, aerogel samples without TMCS/MTMS treatment were shown to have hydrophilic properties with water contact angle of 0°. Water contact angle measurements were also performed on the cross-sectional area of the treated PET aerogel samples. There was no significant difference found between the water contact angle values of the external surface and internal cross-sectional surface. This confirmed that the superhydrophobicity was distributed uniformly in the aerogel structure. The contact angle values are summarized in Table 3 below.

TABLE 3

Water contact angles of different PET aerogels

| Sample Name | Mass Density (Denier) | Fiber length (mm) | TMCS/ MTMS Treatment | Water contact angle (°) | Properties of PET aerogel |
|---|---|---|---|---|---|
| Method A | | | | | |
| PSA 1 | 3 | 64 | Yes | 149.9 ± 4.0 | Superhydrophobic |
| PSA 2 | 3 | 64 | Yes | 140.4 ± 4.6 | Superhydrophobic |
| PSA 3 | 4 | 64 | Yes | 145.8 ± 4.1 | Superhydrophobic |
| PSA 4 | 7 | 64 | Yes | 143.2 ± 7.2 | Superhydrophobic |
| PSA 5 | 15 | 64 | Yes | 145.9 ± 2.4 | Superhydrophobic |
| PSA 6 | 3 | 64 | No | 0 | Superhydrophilic |
| PSA 7 | 15 | 64 | No | 0 | Superhydrophilic |
| PSA 8 | 15 | 32 | No | 0 | Superhydrophilic |
| Method B | | | | | |
| PSA 9 | 7 | 64 | Yes | 145.5 ± 2.8 | Superhydrophobic |
| PSA 10 | 7 | 64 | Yes | 141.4 ± 7.1 | Superhydrophobic |
| PSA 11 | 7 | 64 | No | 0 | Superhydrophilic |

Thermal Conductivity of the PET Aerogels

To investigate the thermal insulation performance of the PET aerogels, thermal conductivity measurements were carried out with a C-Therm TCi Thermal Conductivity Analyzer System. The PET aerogels showed low thermal conductivities (0.033-0.047 W/mK), as shown in Table 4. This shows that PET is a good alternative for silica aerogel composites in terms of its thermal insulation properties.

TABLE 4

Thermal conductivities of the PET aerogels

| Sample Name | Mass Density (Denier) | Fiber length (mm) | DCM Treatment | Thermal conductivity, K (W/m · K) |
|---|---|---|---|---|
| Method A | | | | |
| PSA 1 | 3 | 64 | Yes | 0.037 ± 0.001 |
| PSA 2 | 3 | 64 | Yes | 0.039 ± 0.001 |
| PSA 3 | 4 | 64 | Yes | 0.039 ± 0.001 |
| PSA 4 | 7 | 64 | Yes | 0.037 ± 0.001 |
| PSA 5 | 15 | 64 | Yes | 0.037 ± 0.001 |
| PSA 6 | 3 | 64 | Yes | 0.037 ± 0.001 |
| PSA 7 | 15 | 64 | No | 0.042 ± 0.001 |
| PSA 8 | 15 | 32 | No | 0.047 ± 0.001 |
| Method B | | | | |
| PSA 9 | 7 | 64 | No | 0.036 ± 0.001 |
| PSA 10 | 7 | 64 | No | 0.034 ± 0.001 |
| PSA 11 | 7 | 64 | No | 0.033 ± 0.001 |

The thermal conductivities (0.033-0.047 W/mK) of the PET aerogels were lower than those of PET fibers in general (0.15-0.4 W/mK), and competitive to those of conventional insulation materials, such as polyurethane foams (0.02-0.04 W/mK) and insulation boards (0.035-0.16 W/mK). As suggested by Table 4, the thermal conductivities of the PET aerogels (0.033-0.047 W/mK) increased with the treatment of dichloromethane (DCM) to the PET fiber prior to the aerogel fabrication. This is because the PET fibers obtained from the supplier were coated with some chemicals for finishing purposes. This reduced the surface area of PET exposed to silica particles, which inhibited the cross-linking process between PET and silica particles during gelation and aging and hence affected the thermal insulation properties of the PET aerogel samples.

Thermal Stability of the PET Aerogels

Pure silica aerogels generally have high thermal stability and hence have small weight loss of approximately 14.7%. However, when they are reinforced with other materials to form composite, thermal stability of the composite is often lower than that of pure silica aerogels. From FIG. 9(a), it can be observed that PET concentration in the reaction media affected the thermal stability of the PET aerogels. With increasing PET fiber concentration, the percentage weight loss of the sample increased as well. This was because lesser silica particles were present in samples with higher PET fiber concentration which resulted in the lower thermal stability of samples PSA 2 and PSA 3 (1.6 g/100 ml and 1.2 g/100 ml, respectively). In addition, an approximately 15% initial weight loss observed with PSA 8 was due to the loss of moisture in the sample as temperature increased to 100° C. This was due to PSA 8 being hydrophilic as it did not undergo TMCS treatment, unlike samples PSA 2 and PSA 3. Recycled PET fiber (3D, 64 mm) is a hydrophobic material and thus no weight loss due to loss of moisture was observed during the initial temperature increase of the TGA test.

The PET-PVA aerogels had small weight loss of approximately 10.0% as temperature increased to 300° C. due to the loss of the PVA in the samples. With increasing PET fiber concentration, the percentage weight loss of the sample did not change, as seen from FIG. 9(b). The thermal stability of the PET aerogels was from 400-450° C.

Thermal Stability of Fire Retardant Treated PET Aerogels

Figure 10:
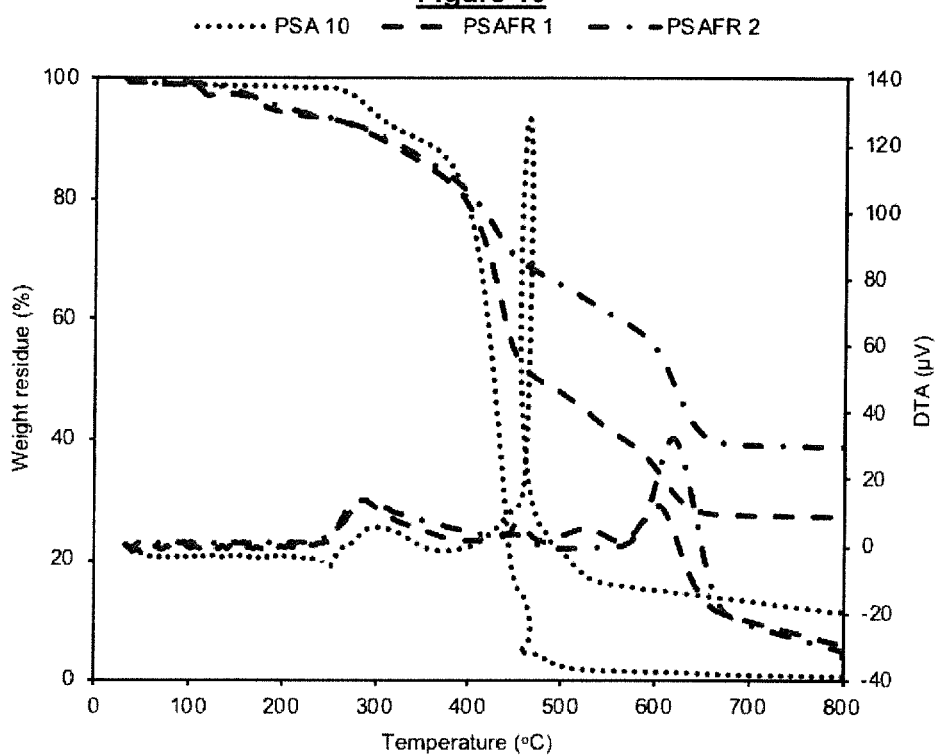
FIG. 10 shows the thermal stability of surface treated PET aerogels according to one embodiment of the present invention.

The fire-retardant treatment improved thermal stability of the PET aerogels, as evidenced by the TGA results of FIG. 10. The greater thermal stability observed for the fire-retardant treated PET aerogel was due to the present of polysiloxane in the commercial ceramic coating as well as charring of the ceramic coating to provide heat insulation. Above 620° C., the remaining weight of the fire-retardant treated PET aerogels samples, which corresponded to the ceramic coating, plateaued at 30% and 40 wt % with fire-retardant coating and PET aerogels ratio of 1.5 and 3.0, respectively.

The PET aerogel contains cross-linked bonds between PET and PVA, and it decomposed in two steps. The first peak observed in the differential thermal analysis (DTA), occurs approximately at 280° C., which can be attributed to the decomposition of the cross-link between PET and PVA; whereas, the second peak of the DTA corresponds to the decomposition of the PET polymer. Comparing the DTA curves, the overlapping peaks of the fire-retardant treated PET aerogels shows that the concentration of the fire-retardant solution has no effect on the initial decomposition of the PET/PVA cross-link. It is also apparent that the fire-retardant coating on the PET aerogel delayed PET decomposition from 450° C. to 620° C., and increasing the concentration of the fire-retardant solution by two-fold delayed decomposition of the PET by 20° C. The observed improvement in thermal stability may be due to the thicker ceramic coating on the aerogel which has a positive effect on the thermal resistance of the aerogels.

Mechanical Properties of the PET Aerogels

Figure 11A:
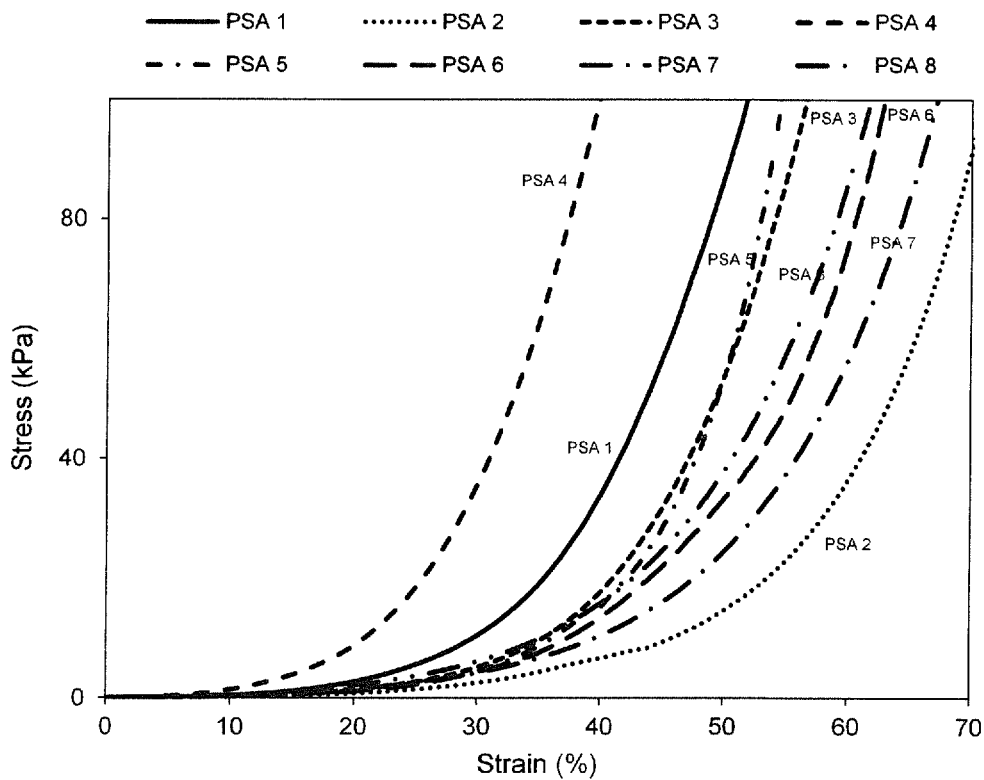
FIG. 11(a) shows samples of PET-TEOS aerogels and FIG. 11(b) shows samples of PET-PVA aerogels.
Figure 11B:
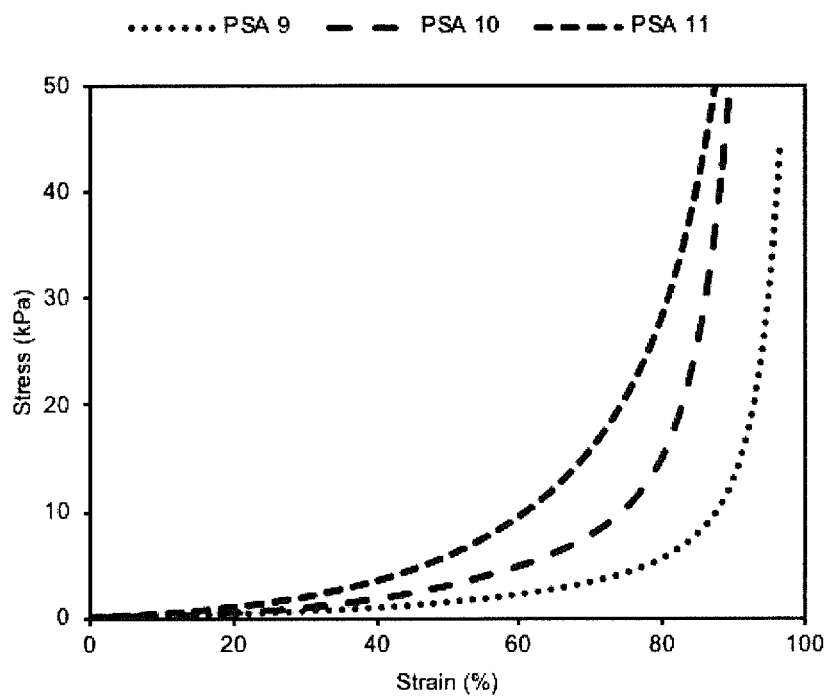

The mechanical properties of the aerogels are very important for thermal insulation applications. To find out about these properties, compressive tests were carried out for the aerogel samples. Compressive strain-stress curves of the PET aerogels are shown in FIG. 11. Pure silica aerogels are known to be very brittle, having a very high Young's odulus of 0.1-10 MPa. By introducing PET fibers to the silica aerogel matrix, the mechanical properties of the aerogels improved dramatically. The aerogel samples have much lower compressive Young's oduli, which significantly reduces the silica aerogel's brittleness and enhances its elasticity.

The compressive Young's moduli of the PET aerogel samples (0.95-5.97 kPa) were much lower than those of silica aerogels as shown in Table 5. Also, they are affected by the physical properties of the aerogel, such as, the aerogel's density and the rPET fiber mass density. By comparing PSA1, PSA2 and PSA3, it can be observed that with the average compressive Young's modulus of the aerogel increased with increasing aerogel's density. In addition, aerogels that were not treated with TMCS (PSA6, PSA7 and PSA8) generally had higher average compressive Young's modulus. This might be due to the collapsing of silica gel network during the ambient drying process, which caused the aerogel to have a higher density. This translated to a more rigid product, which resulted in a higher compressive Young's modulus. Also, the PET aerogels sprang back to their original shape instead of being deformed after going through the compression tests. As such, it showed good durability for repeated usages.

TABLE 5

Compressive Young's modulus of PET aerogels

| Sample Name | Mass Density (Denier) | Density of samples (g/cm³) | TMCS/ MTMS Treatment | Average compressive Young's modulus of aerogel (kPa) |
| --- | --- | --- | --- | --- |
| Method A | | | | |
| PSA 1 | 3 | 0.170 ± 0.005 | Yes | 2.19 ± 0.34 |
| PSA 2 | 3 | 0.097 ± 0.005 | Yes | 0.95 ± 0.24 |
| PSA 3 | 3 | 0.149 ± 0.005 | Yes | 1.20 ± 0.28 |
| PSA 4 | 7 | 0.181 ± 0.005 | Yes | 3.94 ± 1.03 |
| PSA 5 | 15 | 0.082 ± 0.005 | Yes | 1.37 ± 0.19 |
| PSA 6 | 3 | 0.345 ± 0.005 | No | 4.19 ± 0.32 |
| PSA 7 | 15 | 0.181 ± 0.005 | No | 2.40 ± 0.25 |
| PSA 8 | 15 | 0.165 ± 0.005 | No | 2.57 ± 0.36 |
| Method B | | | | |
| PSA 9 | 7 | 0.0185 ± 0.005 | Yes | 2.06 ± 0.45 |
| PSA 10 | 7 | 0.027 ± 0.005 | Yes | 2.42 ± 0.69 |
| PSA 11 | 7 | 0.044 ± 0.005 | No | 5.97 ± 0.18 |

Oil Absorption of the PET Aerogels

Oil absorption capacity tests of the PET aerogels were also conducted. Each sample was immersed into the motor oil or water for 30 minutes to reach the equilibrium and then was drained for another 20 minutes to determine the weight. The oil absorption capacity of the PET aerogels was determined to be 12.5-49.5 g/g.

Sound Absorption of the PET Aerogels

Figure 12A:
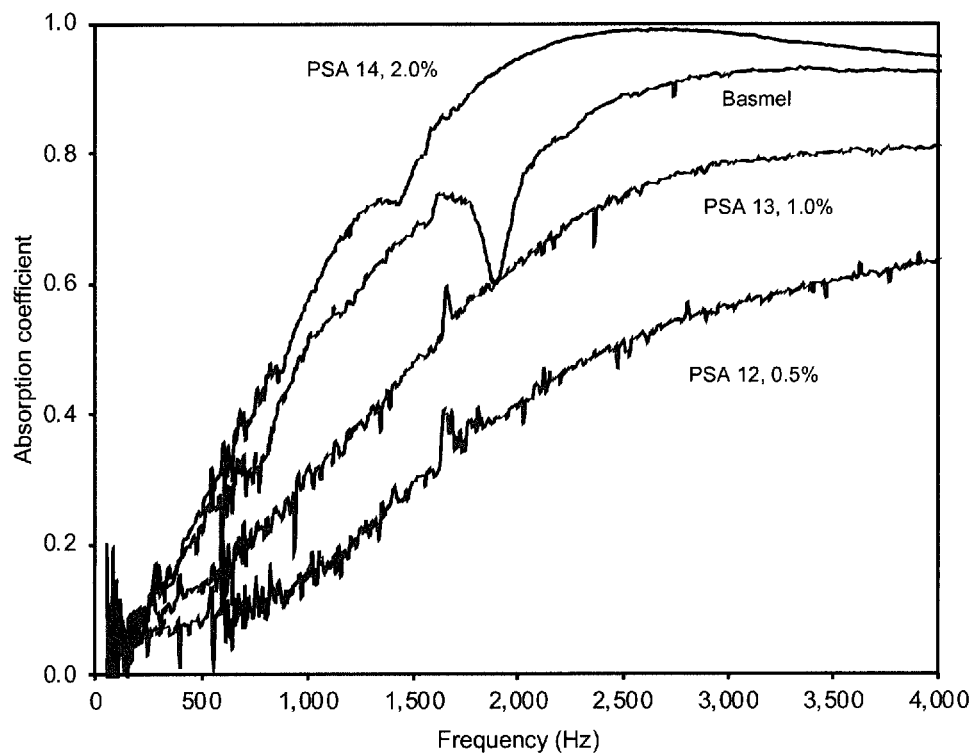
FIG. 12(a) shows sample of PET aerogels (7D, 64 mm, 30 mm thickness) with different concentration compared with Basmel (commercial sound insulation material)

To investigate the sound insulation performance of the PET aerogels, sound absorption coefficient was conducted at different PET concentration and thickness with an Impedance Tube based on ASTM 1050. The PET aerogels showed a greater sound absorption coefficient when increasing the PET concentration and the thickness of samples, as seen in FIG. 12.

The absorption coefficient was also compared with commercial sound insulation materials (Basmel). Noise reduction coefficient (NRC), a simple quantification of absorption of sound by material, was calculated by the arithmetic average of the absorption coefficients determined at the octave band of 250 Hz, 500 Hz, 1000 Hz, and 2000 Hz. The NRC values of PET aerogels and Basmel were tabulated in Table 6. The 2% PET aerogels showed better sound insulation performance than Basmel, with NRC value of 0.45 and 0.40, respectively.

TABLE 6

NRC values of the PET aerogels and commercial sound insulation material

| Sample | PET content (%) | Thickness (mm) | NRC |
| --- | --- | --- | --- |
| PSA 12 | 0.5 | 30 | 0.15 |

TABLE 6-continued

NRC values of the PET aerogels and commercial sound insulation material

| Sample | PET content (%) | Thickness (mm) | NRC |
|---|---|---|---|
| PSA 13 | 1.0 | 30 | 0.30 |
| PSA 14 | 2.0 | 30 | 0.45 |
| PSA 15 | 1.0 | 10 | 0.10 |
| PSA 16 | 1.0 | 20 | 0.20 |
| Basmel | — | 30 | 0.40 |

$CO_2$ Absorption of the PET Aerogels

The PET aerogels were also treated with 3-aminopropyltrimethoxysilane (APS) to change their surface properties for $CO_2$ absorption. After APS treatment, the amine groups were generated on the surface of PET aerogels via silanation reaction (FIG. 6). Thus, the PET aerogels were used as supported amine materials for significant $CO_2$ uptake. In this study, the $CO_2$ absorption capacity of the treated PET aerogels was 0.5-1.5 mmol $CO_2$/g.

The invention claimed is:

1. A polyethylene terephthalate (PET) aerogel comprising a porous network of cross-linked recycled PET fibers, wherein the PET aerogel has a thermal conductivity of 0.030-0.050 W/m K.

2. The PET aerogel according to claim 1, wherein the recycled PET fibers comprised in the PET aerogel are obtained from PET plastic bottles.

3. The PET aerogel according to claim 1, wherein the cross-linked recycled PET fibers comprised in the aerogel are cross-linked with a cross-linker selected from: tetraethoxysilane (TEOS), polyvinyl alcohol (PVA), glutaraldehyde (GA), methyltrimethoxysilane (MTMS), sodium silicate, bentonite, starch, nanoclay, or a combination thereof.

4. The PET aerogel according to claim 3, wherein the cross-linker is TEOS.

5. The PET aerogel according to claim 3, wherein the cross-linker is a combination of PVA and GA.

6. The PET aerogel according to claim 1, wherein the PET aerogel has a density of 0.007-0.450 g/cm$^3$.

7. The PET aerogel according to claim 1, wherein the PET aerogel has a compressive Young's modulus of ≤130.0 kPa.

8. The PET aerogel according to claim 1, wherein the PET aerogel is superhydrophobic and has a contact angle of 120-150°.

9. A method of forming the PET aerogel according to claim 1, the method comprising:
hydrolysing recycled PET fibers to form hydrolysed recycled PET fibers, wherein the hydrolysing forms at least carboxylic groups on a surface of the hydrolysed recycled PET fibers;
cross-linking the hydrolysed recycled PET fibers with a cross-linker;
gelation of the cross-linked recycled PET fibers; and
drying to form the PET aerogel.

10. The method according to claim 9, wherein the method further comprises sonicating the cross-linked recycled PET fibers prior to the drying.

11. The method according to claim 9, wherein the hydrolysing comprises hydrolysing under acidic or base catalysis.

12. The method according to claim 9, wherein the cross-linker is selected from: tetraethoxysilane (TEOS), polyvinyl alcohol (PVA), glutaraldehyde (GA), methyltrimethoxysilane (MTMS), sodium silicate, bentonite, starch, nanoclay, or a combination thereof.

13. The method according to claim 9, wherein the method further comprises modifying the surface of the PET aerogel.

14. The method according to claim 13, wherein the modifying comprises treating the surface of the PET aerogel with: chlorotrimethylsilane (TMCS), methoxytrimethylsilane (MTMS), 3-aminopropyltrimethoxysilane (APS), fire-retardant ceramic coating solution, or a combination thereof.

15. The method according to claim 9, wherein the cross-linker is TEOS.

16. The method according to claim 15, wherein the gelation comprises condensation of the cross-linked recycled PET fibers.

17. The method according to claim 15, wherein the drying comprises aging for a pre-determined period of time.

18. The method according to claim 9, wherein the cross-linker is PVA.

19. The method according to claim 18, wherein the cross-linker further comprises GA.

20. The method according to claim 18, wherein the drying comprises freezing and freeze-drying.

* * * * *